United States Patent
Schöne et al.

(10) Patent No.: US 6,462,494 B1
(45) Date of Patent: Oct. 8, 2002

(54) FAN WITH PRESET CHARACTERISTIC CURVE

(75) Inventors: Jürgen Schöne; Hartmut Schneeweiss, both of Bad Mergentheim; Wilhelm Reinhardt, Schrozberg-Gütbach, all of (DE)

(73) Assignee: ebm Werke GmbH & Co., Mulfingen (DE)

( * ) Notice: Subject to any disclaimer, the term of this patent is extended or adjusted under 35 U.S.C. 154(b) by 0 days.

(21) Appl. No.: 09/533,143

(22) Filed: Mar. 23, 2000

(30) Foreign Application Priority Data

Mar. 23, 1999 (EP) .............................. 99105065

(51) Int. Cl.$^7$ ................................. H02P 7/04
(52) U.S. Cl. .................. 318/433; 388/815; 388/800; 318/481; 417/22; 417/42; 417/44.11
(58) Field of Search ................. 318/432, 433, 318/481, 254; 388/800, 815; 417/44.11, 22, 42, 18; 416/189

(56) References Cited

U.S. PATENT DOCUMENTS

| | | | | | |
|---|---|---|---|---|---|
| 4,467,657 A | * | 8/1984 | Olsson | ...................... | 73/861 |
| 4,638,233 A | * | 1/1987 | Erdman | ...................... | 318/644 |
| 4,806,833 A | | 2/1989 | Young | ...................... | 318/335 |
| 4,978,896 A | | 12/1990 | Shah | ...................... | 318/284 |
| 5,019,757 A | | 5/1991 | Beifus | ...................... | 318/254 |
| 5,202,951 A | * | 4/1993 | Doyle | ...................... | 388/811 |
| 5,269,660 A | * | 12/1993 | Pradelle | ...................... | 417/18 |
| 5,447,414 A | * | 9/1995 | Nordby et al. | ................. | 417/20 |
| 5,736,823 A | | 4/1998 | Nordby et al. | ............... | 318/432 |
| 5,810,555 A | * | 9/1998 | Savage et al. | ............... | 416/189 |

FOREIGN PATENT DOCUMENTS

| | | |
|---|---|---|
| DE | 29516268 U1 | 4/1996 |
| WO | PCT/FR91/00532 | 1/1992 |
| WO | PCT/EP97/04041 | 2/1998 |

* cited by examiner

Primary Examiner—Rita Leykin
(74) Attorney, Agent, or Firm—Harness, Dickey & Pierce, P.L.C.

(57) ABSTRACT

A tan having a fan wheel and an electric motor driving it, and a control unit for controlling the motor output as a function of fan-specific parameters. An actual-value signal corresponding to an actual rotational speed of the fan is measured and compared with a control signal corresponding to a required speed, and the actual speed is adjusted to the required speed by means of the control unit, wherefore the actual speed and the actual motor current or supply current are measured and conducted to a microcontroller as input signal variables, whereby the fan-specific data such as wheel diameter, density of the conveying medium, fan coefficients, motor coefficients, and a preset artificial characteristic curve $p_s = f(\dot{V}_s)$ are stored in the microcontroller as default values. The microcontroller generates the required-speed signal, which is a function of the electrical current variables and the actual speed, based on the preset artificial characteristic curve $p_s = f(\dot{V}_s)$ where $p_s$=required operating pressure and $\dot{V}_s$=required volume flow.

11 Claims, 3 Drawing Sheets

FAN WITH PRESET CHARACTERISTIC CURVE

BACKGROUND OF THE INVENTION

1. Technical Field of the Invention

The present invention relates to a fan consisting of a fan wheel driven by an electromotor, whereby the electromotor is controlled in relation to its rotational speed by a control unit.

2. Discussion

An open-loop control system for an electromotor for a fan, that delivers a constant back-pressure, is known from U.S. Pat. No. 5,019,757. A required speed is determined from the motor torque, speed signal, and a preset streaming pressure of the fan, and is achieved by means of a control algorithm.

An open-loop control system for an electromotor for a fan, that delivers a constant volume flow, is known from U.S. Pat. No. 4,978,896. A required speed is determined from the motor torque, speed signal, and a preset volume flow, and is achieved by means of a control algorithm.

An open-loop control system for an electromotor for a fan, that delivers a constant volume flow, is known from U.S. Pat. No. 4,806,833, whereby a required speed is determined on the basis of the speed and a preset volume flow and speed by means of a control algorithm.

A fan consists of a blower wheel, which is driven by an electromotor with a rotational speed n. The fan has the task of delivering a medium with a density $\rho$ with a volume flow $\dot{V}$ against a back-pressure p. The variables p, $\dot{V}$, n and other electrical variables of the motor are measured on a metering pipe. The description of the back-pressure across the volume flow is represented in a so-called air performance characteristic $p=f(\dot{V})$, see FIG. 1. In conventional fans without speed control, the blower wheel will arrive at a speed in which the motor output torque equals the fan's input torque. The air performance characteristics shown in FIG. 1 were each recorded for a particular speed. If different rotational speeds are taken as a basis, then a particular curve can be measured for each speed, so that a whole field of characteristic curves can be produced for a special fan. But these kinds of fields can also be produced for different wheel sizes and/or different densities of the medium to be delivered.

In a fan with a so-called "artificial" characteristic curve, the fan is supposed to achieve a preset $p(\dot{V})$ curve. Here, closed-loop control of the speed is supposed to be conducted exactly in such a way that this preset air performance characteristic is obtained. Such a control is relatively easy to realize, if the variables p and/or $\dot{V}$ are measured directly at the fan. But this requires expensive measurements using expensive sensors for pressure and/or volume flow.

Proceeding from the known prior art, in which only one particular characteristic curve can be set, it is the objective of the present invention to make available a fan, which can be driven on any arbitrary artificial characteristic curve by controlling the speed by measuring the motor parameters, electrical variables, and the speed.

SUMMARY OF THE INVENTION

In accordance with the invention, this is achieved for a fan of the type described in the introduction, in that an actual-value signal corresponding to the fan's actual speed is measured and compared with a control signal corresponding to a required speed, and the actual speed is adjusted to the required speed by means of the control unit, wherefore the actual speed $n_a$ and an actual motor current $i_a$ or a supply current $I_b$ are measured and conducted to a microcontroller as input signal variables, and the fan-specific data such as wheel diameter, density of the conveying medium, fan coefficients, motor coefficients, and a preset artificial characteristic curve $p=f(V_s)$ are stored in the microcontroller as default values, and the microcontroller generates the required-speed signal $n_s$, which is a function of the electrical current variables $I_a$ or $I_b$ and the actual speed $n_a$, based on the preset artificial characteristic curve $p_s=f(V)$ where $p_s$=required operating pressure and $V_s$=required volume flow.

BRIEF DESCRIPTION OF THE DRAWINGS

Further features and advantages of the invention will become apparent from the following discussion and accompanying drawings, in which:

FIG. 5 is a field of characteristic curves in accordance with FIG. 1, where different preset artificial characteristic curves are drawn in;

DETAILED DESCRIPTION OF THE PREFERRED EMBODIMENT

The following description of the preferred embodiment is merely exemplary in nature, and is in no way intended to limit the invention or its application or uses.

Figure 2:
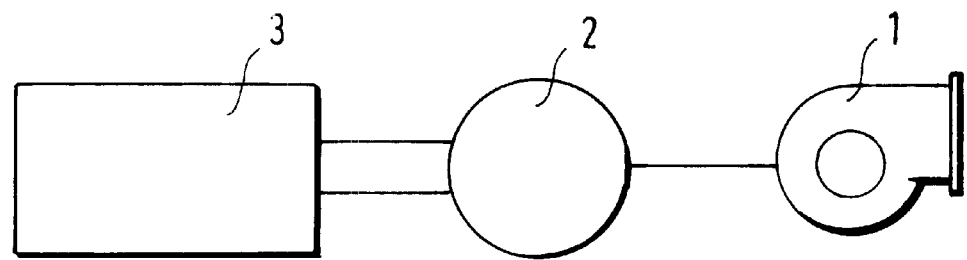
FIG. 2 is a schematic diagram of a fan in accordance with the invention.

As shown in FIG. 2, a fan in accordance with the invention includes a fan component 1, which features a fan wheel with several blades. The fan wheel runs in a housing with one or several intake and exhaust openings. The fan wheel is preferably driven by an electronic commutated DC motor 2. This motor 2 is controlled by an electronic control unit 3, which realizes both the motor function and the control function to realize an artificial fan characteristic curve, as is possible in accordance with the invention. Among other things, this control unit 3 includes a microcontroller 4, see FIGS. 3, 4. As can be determined from FIG. 3 or 4, the control unit 3 has two open-loop control components, and indeed, a motor electronics 5 on the one hand, which operates the motor, and a fan control module 6. The motor electronics 5 and the control module 6 each feature an interface, which connects them together. A power supply unit 8 for supplying power to the control electronics 7 and an output stage 9 for controlling the winding of the motor 2 are both located within the motor electronics 5. Both the power unit and the output stage 9 are connected with a voltage input 10 which, for example, can feature an input voltage of 24V, 28V DC or 230V AC. The voltage supply for the power supply unit 8 and the output stage 9 are preferably 24V or 48V.

There is again a power unit 11 within the control module 6 for supplying power to the microprocessor 4 and an EEPROM component 12. Furthermore, a current sensor 13, which measures the actual current $I_b$ in the lead 2 and conducts it to microprocessor 4 as the actual-value variable, is arranged within the control module 6 or in a separate component. Moreover, the actual speed $n_a$ coming from the control electronics 7 is fed to the microprocessor 4 as the speed signal.

The fan control module 6 furthermore has a control input 15, which can be used to enter a particular preset artificial characteristic curve. The microcontroller 4 computes the required speed $n_s$ from the fan-specific data such as wheel diameter, density of the conveying medium, fan and motor coefficients, the motors internally measured variables, and the preset artificial characteristic curve $p_s f(\dot{V}_s)$ Among other things, a PI or PID controller, which carries out the fan motor's speed control across the interface using the microelectronics 5, is realized in the microcontroller 4. Here, we are dealing with a closed-loop control, which is tuned to a slow-reacting control loop. A control signal $U_{ST}$, for attaining the desired required speed $n_s$, is conducted to the control electronics 7 across an outlet 16 of the microprocessor as an actuating variable. In addition, the fan's current operating point $p_a$, $\dot{V}_a$ can be outputted across an interface 22.

The control electronics 7 likewise features an inlet 17 for an actual-value signal of the current speed $n_a$ of the fan's fan wheel. The signal is detected by a conventional Hall-sensor technique. A switched-mode power supply (SMPS) 18 (indicated by dashed lines), for sake of an example, is provided between power unit 11 and power unit 8 or output stage 9, respectively, (e.g. within the microprocessor module) for the case where voltage input 10 is 230V AC.

The motor electronics 5 and the fan control module 6 can both be implemented as one unit, whereby different components can be united. Thus, for example, only one power unit will be required and a single microprocessor can carry out both the algorithms for achieving the preset artificial characteristic curve and also generate the required commutating signals.

Besides detecting the current in the lead, direct determination of the motor's current $I_a$ is also possible. For this, the current sensor 13 must be arranged at the outlet of the corresponding output stage (See FIG. 4). The outlet's signal will be conducted to microprocessor 4 instead of the current sensor 13 in fan control module 6. This has essentially no influence on signal processing. There is only one other minor statement to be taken into consideration in the equations, as will be described below. Otherwise, the construction of the circuit of FIG. 4 essentially corresponds to that of FIG. 3.

The function of the open-loop or closed-loop control, respectively, in accordance with the invention is as follows:

1. Preset "Artificial" Characteristic Curve $p_s=f(\dot{V}_s)$

Figure 5:
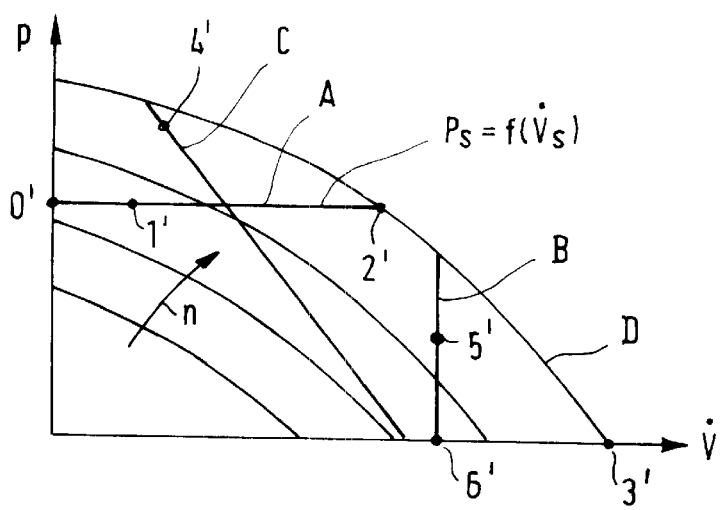

The preset artificial characteristic curve is given as linear in the $p(\dot{V})$ diagram, see curve C in FIG. 5.

The variables $a_v$ and $b_v$ are constants, which are to be selected as a function of the preset artificial characteristic curve. But other statements, such as nonlinear statements for example, could be given.

By proper choice of coefficients, we obtain the following special cases:

$b_v=0$ results in a characteristic curve at constant pressure. See curve A in FIG. 5.

for $b_v$ appropriately large, and matching $a_v$, we obtain characteristic curves that approximate volume constants. See curve B in FIG. 5.

Of course, no curves outside of the maximum (uncontrolled) curve, curve D in FIG. 5, can be realized.

The system including a motor 2, blower wheel, and airflow is a relatively slow-reacting system. In the setting of this invention, it is therefor sufficient if a given point on the curve is only reached in a time period whose order of magnitude is measured in seconds. In the views that follow, it will be assumed that dynamic events are negligible.

2. Motor's Characteristic Curve

To determine the actual operating point $p_a$ of the fan 1, it is necessary to know what actual torque $M_a$ and what actual rotational speed $n_a$ are driving the blower wheel. For this, it is expedient (see FIG. 3) to derive the actual torque $M_a$ from the current supply current $I_b$ and the control factor $U_{ST}$. The shape of the curve $M_a(I_b, U_{ST})$ can be described by the following approximation function:

$$M_a = a_{MS} + b_{MS} \cdot U_{ST} + c_{MS} \cdot I_b + d_{MS} \cdot U_{ST} \cdot I_b \quad (2)$$

Figure 4:
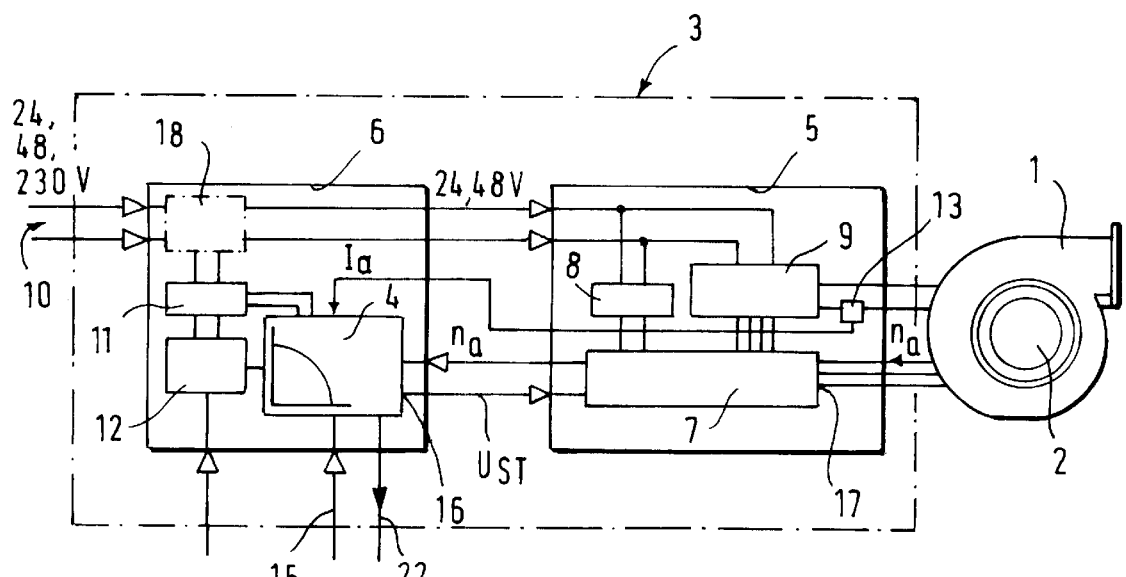
FIG. 4 is a block diagram of the fan in accordance with FIG. 2 with an alternative current measurement to that of FIG. 3.

In the embodiment in accordance with FIG. 4, the motor torque $M_a$ can be derived from the actual motor current $I_a$. Here the shape of the curve $M_a(I_a)$ can be described by the following approximation function:

$$M_a = a_{M2} + b_{M2} \cdot I_a \quad (2a)$$

$$M_a = a_{M3} + b_{M3} \cdot I_a + c_{M3} \cdot I_a^2 \quad (2b)$$

$$M_a = a_{M4} + b_{M4} \cdot I_a + c_{M4} \cdot I_a^2 + d_{M4} \cdot I_a^3 \quad (2c)$$

The constants $a_{M2}$ through $d_{M5}$ are motor-specific and must be established by torque measurements for each model of the motor. These constants are filed in the appropriate memory devices of the fan control module 6.

3. Fan's Characteristic Curve

Figure 1:
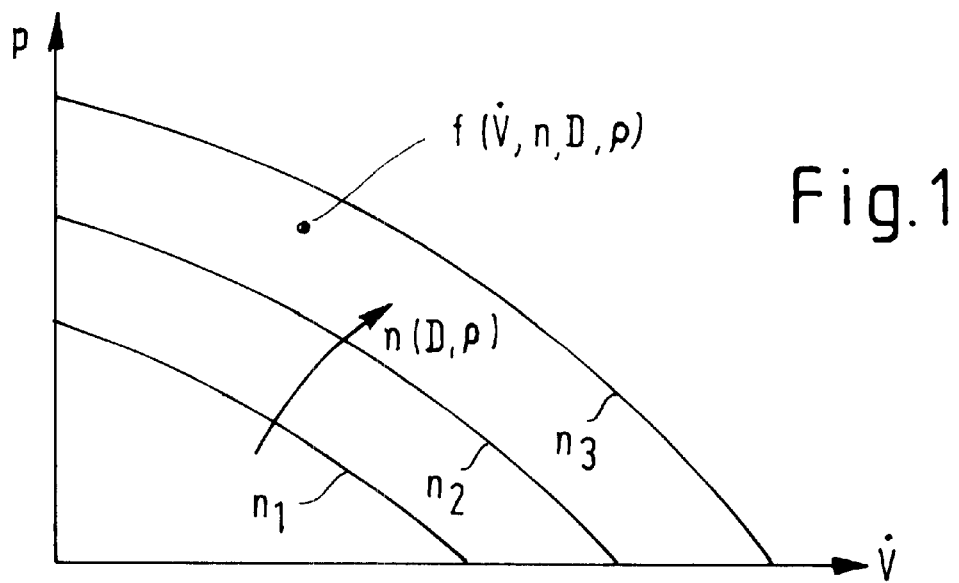
FIG. 1 is the field of characteristic curves with pressure-volume flow curves from a fan of known design.

The fan's fluidic behavior is described by the $p(\dot{V})$ curve (See FIG. 1). Assuming that the laws of similarity apply, the influence of the wheel diameter D, speed n, and air density ρ, which is viewed as a constant, can be eliminated by introducing dimensionless quantities pressure coefficient Ψ, volume coefficient φ, and performance coefficient λ. These are:

$$\varphi = \frac{4 \cdot \dot{V}}{\pi^2 \cdot D^3 \cdot n} \quad (3)$$

$$\Psi = \frac{2 \cdot p}{\rho \cdot \pi^2 \cdot D^2 \cdot n^2} \quad (4)$$

$$\lambda = \frac{16 \cdot M}{\rho \cdot \pi^3 \cdot D^5 \cdot n^2} \quad (5)$$

Figure 6:
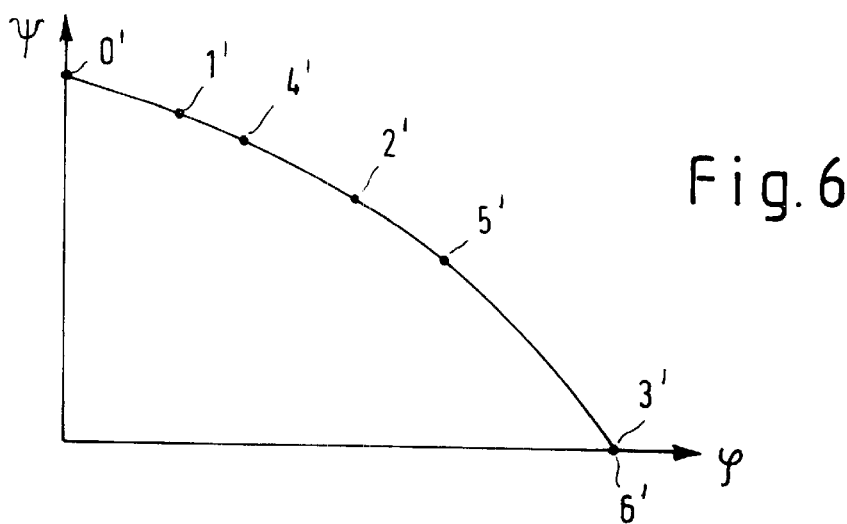
FIG. 6 is a representation of a dimensionless characteristic curve $\Psi=f(\phi)$, corresponding to the algorithm in accordance with the invention.

In this way, the fan 1 can be described by the dimensionless characteristic curves Ψ(φ) and λ(φ) instead of the dimension-laden $p(\dot{V})$ curve. FIG. 6 represents the points of FIG. 5 without dimensions. The points, which lie on a family of curves in FIG. 5, are all now on a single curve. The advantage of this representation is that the shape of these curves is independent of speed, wheel diameter, and air density, and can therefore be represented by a single characteristic curve corresponding to FIG. 6. If the Ψ(φ) and λ(φ) curves are known, the dimensioned values on the curve can be computed by entering n, D, and ρ. It is expedient to approximate the shape of the Ψ(φ) and λ(φ) curves with quadratic functions:

$$\Psi = a_p + b_p \cdot \phi + c_p \cdot \phi^2 \quad (6)$$

$$\lambda = a_L + b_L \cdot \phi + c_L \cdot \phi^2 \quad (7)$$

The constants $a_p, \ldots c_L$ are fan-specific and must be determined by air performance measurements. These constants are filed in the appropriate memory devices of fan control module 6.

4. Closed-loop Control of the Motor

Figure 7:
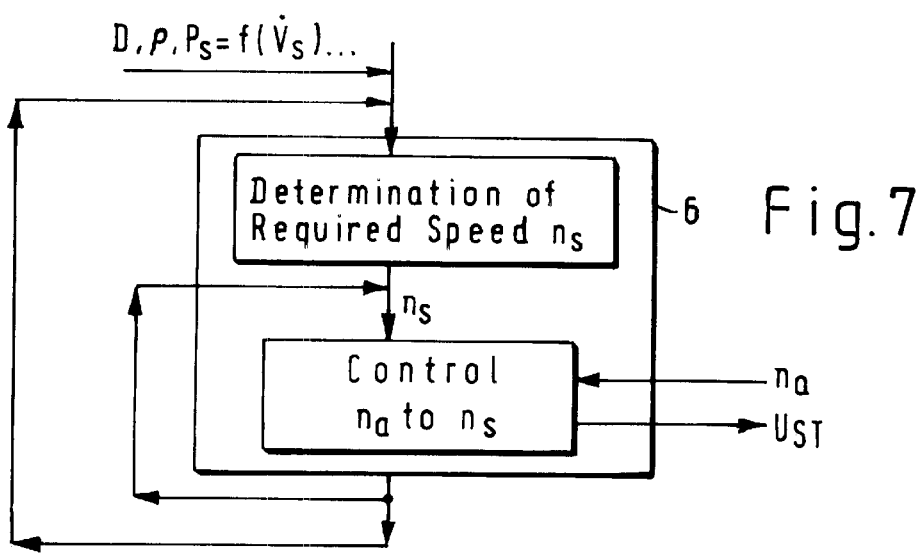
FIG. 7 schematic diagram of the closed-loop control system in accordance with the invention.

The realization of a fan with artificial characteristic curve amounts to controlling the fan's rotational speed as a function of the actual loading condition. This is realized by 2 nested loops, as represented in FIG. 7. The inner loop, which achieves and maintains a given motor speed, will not be explained in more detail and can be achieved with known attempts. (PI or PID controller tuned to slow-reacting control loop).

5. Determination of the Required Speed

In the following, we will describe how to go about determining the required speed $n_s$.

a) Default values, such as coefficients of the required characteristic curves, wheel diameter D, density $\rho$, fan coefficients, and motor coefficients must be stated.
b) Detect the actual speed $n_a$.
c) Detect the actual motor current $I_a$ or supply current $I_b$.
d) Compute the actual motor output torque $M_a$ by equation (2), (2a), (2b), or (2c).
e) Compute the actual performance coefficient from equation (5)

$$\lambda_a = \frac{16 \cdot M_a}{\rho \cdot \pi^3 \cdot D^5 \cdot n_a^2} \quad (8)$$

f) Compute the actual volume coefficient $$\varphi_a = -\frac{b_L}{2 \cdot c_L} + \sqrt{\frac{b_L^2}{4 \cdot c_L^2} - \frac{a_L - \lambda_a}{c_L}} \quad (9)$$

g) Compute the actual pressure coefficient from equation (6)

$$\Psi_a = a_p + b_p \cdot \varphi_a + c_P \cdot \varphi_a^2 \quad (10)$$

h) Compute the actual volume flow from equation (3)

$$\dot{V}_a = \frac{1}{4} \cdot \varphi_a \cdot D^3 \cdot \pi^2 \cdot n_a \quad (11)$$

i) Compute the current pressure increase with equation (4)

$$p_a = \frac{1}{2} \Psi_a \cdot \rho \cdot \pi^2 \cdot D^2 \cdot n_a^2 \quad (12)$$

Compute the new pressure increase on the preset artificial characteristic curve $$p_s = a_V + \frac{b_V^2 \cdot \dot{V}_a^2}{2 \cdot p_a} - \sqrt{\left(a_V + \frac{b_V^2 \cdot \dot{V}_a^2}{2 \cdot p_a}\right)^2 - a_V^2} \quad (13)$$

k) Compute the new rotational speed (the speed required to achieve the preset artificial characteristic curve)

$$n_s = n_a \cdot \sqrt{\frac{p_s}{p_a}} \quad (14)$$

The speed $n_s$ is the required speed, which a known control algorithm is to achieve and maintain in the inner loop, see FIG. 7. The outer loop is to be processed again after passing through the loop a given number of times, $m_i$, or after a preset time has elapsed.

The present invention also makes it possible to design the control components as a separate component as a series device. This will be connected by a predefined interface, which features inlets and outlets for the power supply, speed output signal, and control input signals, without having to interfere with the fan's existing motor electronics. It is thus possible to operate existing fans, that are present on the market, according to an artificial characteristic curve by means of an inexpensive series electronics in accordance with the invention, to be attached separately.

Figure 3:
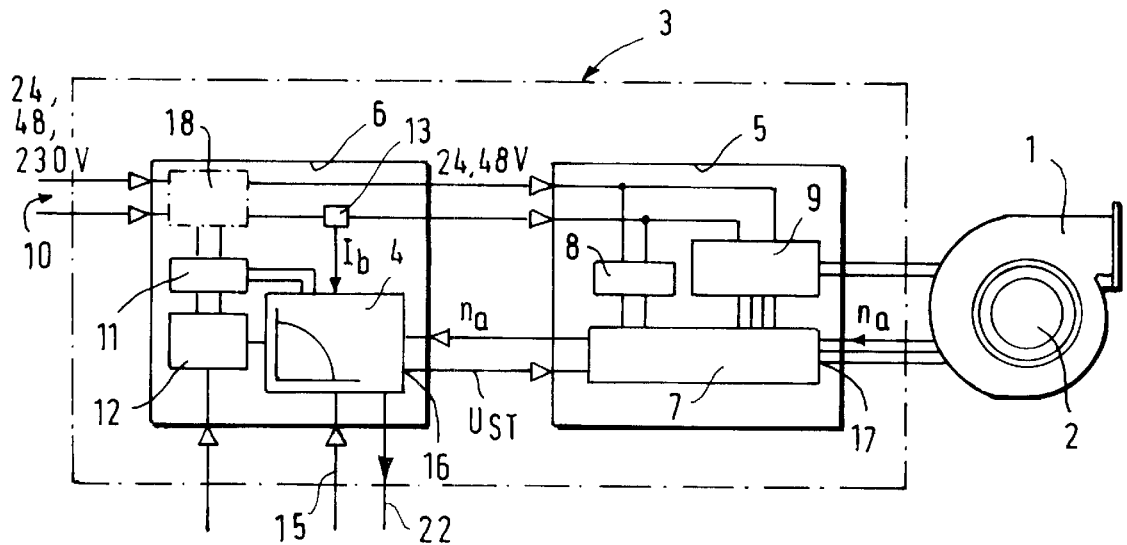
FIG. 3 is a block diagram of the fan in accordance with FIG. 2.

It is furthermore possible to output the fan's current operating point on a suitable interface and display it, see interface 22 in FIGS. 3 and 4.

It is consequently possible, in accordance with the invention, to drive, within preset boundaries, any desired characteristic curve for a fan, i.e. to implement a speed control system in such a way that the fan can attain any desired state, by measuring the motor-specific data alone, such as the actual motor current $I_a$ or supply current $I_b$, and the actual motor torque $n_a$, without additional measuring probes for the volume flow and/or fan pressure.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A fan comprising a fan wheel and an electric motor driving said fan wheel, and a control unit for controlling a motor output as a function of fan-specific data, whereby an actual-value signal corresponding to an actual rotational speed of the fan is measured and compared with a control signal corresponding to a required speed, and said actual speed is adjusted to said required speed by said control unit, said actual speed and at least one of an actual motor current and a supply current being measured and conducted to a microcontroller as input signal variables, said fan-specific data including at least one of wheel diameter, density of a conveying medium, fan coefficients, and motor coefficients, and a preset artificial characteristic curve $p_s = f(\dot{V}_s)$ being stored in said microcontroller as default values, said microcontroller operable to generate said required-speed signal which is a function of at least one electrical current variable and said actual speed, based on said preset artificial characteristic curve $p_s = f(\dot{V}_s)$, where $\rho_a$=required operating pressure and $V_s$=required volume flow.

2. The fan as recited in claim 1, wherein said preset artificial characteristic curve includes a linear function $p_s = f(\dot{V}_s)$ corresponding to $p_s = a + b \cdot \dot{V}_s$ whereby a, b are fan specific constants.

3. The fan as recited in claim 1, wherein said microcontroller includes an algorithm stored in said microcontroller that describes said fan function by dimensionless characteristic curves $\Psi(\phi)$ and $\lambda(\phi)$ corresponding to functions:

$$\Psi = a_p + b_p \cdot \phi + c_p \cdot \phi^2$$

$$\lambda = a_L + b_L \cdot \phi + c_L \cdot \phi^2$$

where

φ is the volume coefficient corresponding to $$\varphi = \frac{4 \cdot \dot{V}}{\pi^2 \cdot D^3 \cdot n}$$

and Ψ is the pressure coefficient corresponding to $$\Psi = \frac{2 \cdot p}{\rho \cdot \pi^2 \cdot D^2 \cdot n^2}$$

and λ is the performance coefficient corresponding to $$\lambda = \frac{16 \cdot M}{\rho \cdot \pi^3 \cdot D^5 \cdot n^2}$$

where D=wheel diameter, n=rotational speed, M=motor's torque, p=operating pressure (pressure increase), and a, b, and c=fan-specific constants.

4. The fan as recited in claim 1, further comprising an actual motor torque being a function of said actual motor current and corresponding to one of the following approximation functions:

$$M_a = a_{M2} + b_{M2} \cdot I_a$$

$$M_a = a_{M3} + b_{M3} \cdot I_a + c_{M3} \cdot I_a^2$$

$$M_a = a_{M4} + b_{M4} \cdot I_a + c_{M4} \cdot I_a^2 + d_{M4} \cdot I_a^3.$$

5. The fan as recited in claim 1, further comprising an actual torque being a function of said supply current and a control factor through the following approximation function:

$$M_a = a_{M5} + b_{M5} \cdot U_{ST} + c_{M5} \cdot I_b + d_{M5} \cdot U_{ST} \cdot I_b.$$

6. The fan as recited in claim 1, wherein said required speed corresponds to the relation $$n_s = n_a \cdot \sqrt{\frac{p_s}{p_a}}$$

and is applied as a control value of the fan (1), whereby $n_a$=actual speed, $p_s$ is the required pressure increase, and $p_a$ is the actual pressure increase.

7. The fan as recited in claim 1 further comprising one of a PI and PID controller for closed-loop control of the fan.

8. The fan as recited in claim 1, wherein said control unit includes a commutating device operable to control said motor function, and a fan control module operably positioned upstream of said commutating device as a separate component.

9. The fan as recited in claim 1, further comprising a first interface operable to output and display a current operating point of the fan.

10. The fan as recited in claim 8, wherein said preset artificial characteristic curve $p_s = f(\dot{V}_s)$ is fed to said fan control module across a control input.

11. The fan as recited in claim 10, wherein said preset artificial characteristic curve $p_s = f(\dot{V}_s)$ is stored in a memory unit in said fan control module.

* * * * *

UNITED STATES PATENT AND TRADEMARK OFFICE
CERTIFICATE OF CORRECTION

PATENT NO. : 6,462,494 B1
DATED : November 6, 2002
INVENTOR(S) : Jurgen Schone, Hartmut Schneeweib and Wilhelm Reinhardt It is certified that error appears in the above-identified patent and that said Letters Patent is hereby corrected as shown below:

<u>Title page,</u>
Item [57], ABSTRACT,
Line 1, delete "A tan" and insert -- A fan --;

<u>Column 2,</u>
Line 2, delete "i" and insert -- I --;

<u>Column 3,</u>
Line 16, delete "$p_s f(V_s)$" and insert -- $p_s = f(V_s)$ --;

<u>Column 6,</u>
Line 53, delete "$p_a$" and insert -- $p_s$ --;
Line 57, delete "fan specific" and insert -- fan-specific --;

Signed and Sealed this

Eighteenth Day of February, 2003

JAMES E. ROGAN
*Director of the United States Patent and Trademark Office*